United States Patent [19]
Gomez et al.

[11] Patent Number: 5,108,497
[45] Date of Patent: Apr. 28, 1992

[54] TREATMENT OF INDIUM DUSTS

[75] Inventors: Nicholas B. Gomez; John P. Hager, both of Golden, Colo.; Charles E. T. White, New Hartford; Laurence G. Stevens, Clinton, both of N.Y.

[73] Assignee: Indium Corporation of America, New Hartford, N.Y.

[21] Appl. No.: 578,013

[22] Filed: Sep. 5, 1990

[51] Int. Cl.$^5$ ............................................ C22B 13/00
[52] U.S. Cl. ........................................ 75/432; 75/688; 75/693; 75/695; 75/706; 75/961; 423/87
[58] Field of Search ............... 75/432, 688, 693, 695, 75/706, 961; 423/87

[56] References Cited

U.S. PATENT DOCUMENTS

| | | | |
|---|---|---|---|
| 1,827,821 | 10/1931 | Kirsebom | 75/961 |
| 2,433,770 | 12/1947 | Lebedeff | 75/420 |
| 4,244,734 | 1/1981 | Reynolds et al. | 75/419 |
| 4,404,026 | 9/1983 | Di Martini et al. | 75/701 |

FOREIGN PATENT DOCUMENTS 151770  11/1981  Fed. Rep. of Germany ........ 75/961

*Primary Examiner*—Melvyn J. Andrews
*Attorney, Agent, or Firm*—Wall and Roehrig

[57] ABSTRACT

Indium-containing feedstocks, such as flue dusts from a refining or smelting process, are treated to increase the concentration of indium and at the same time to reduce the concentrations of lead, copper, and arsenic. The flue dusts are treated in a sodium-doped lead bath at temperatures of 675° to 800° C. Soda ash in the amount of 15 to 35 weight percent is blended with the feed stock and added to the sodium-doped lead bullion. The sodium reacts with the dusts to form a liquid dross, which is removed, cooled, and crushed. The powdered dross is water leached to remove the sodium salts. The indium remains in the filter cake and can be processed by conventional methods for the recovery of indium. About 95% of the indium reports to the filter cake, while lead retention in the filter cake is only about 5-15% of the initial lead content in the dust. A majority of the zinc also reports to the filter cake. A majority of the lead, copper, and silver report to the bullion, and a majority of the arsenic reports to the filtrate. Sodium consumption is about one pound of sodium for each five to ten pounds of feedstock.

10 Claims, 2 Drawing Sheets

TREATMENT OF INDIUM DUSTS

BACKGROUND OF THE INVENTION

This invention relates to the treatment of dusts for the recovery of their metal value, and is more particularly concerned with the recovery of indium from lead and indium-containing dusts and lead from lead-containing dusts in a stirred bath of molten lead which contains dissolved sodium.

In the treatment of copper ores, zinc ores, or lead ores in a smelting operation, residues are produced, i.e., as flue ash or dust. Generally speaking, these dusts or residues can consist primarily of lead with lesser percentages of zinc and copper. Valuable by-products, such as indium, are sometimes present in small amounts, about 0.1% to 2.0%, as well as some silver. Arsenic is also present in many dusts, and can be found in the range of several percent. This element renders the dust toxic and makes disposal difficult. These metals are present in the form of oxides, sulfides, and sulfates or basic sulfates.

Lead bath treatments are employed for separating metallic lead from other metals such as arsenic, tin, antimony, bismuth, or noble metals. An amount of metallic sodium is added to the lead bath, producing a dross or slag, with the impurities reporting the dross. The dross can then be skimmed off. The purpose here is to improve the purity of the lead bullion. One typical separating process that involves sodium addition to molten lead bullion is described in U.S. Pat. No. 4,404,026.

However, no one has previously found an effective technique to recover the metal value of dusts that may contain indium lead and or arsenic, by subjecting them to a straightforward sodium-charged lead bath.

A technique for recovery of metals, such as indium, from flue dusts that may also contain arsenic, is also described in U.S. Pat. No. 4,244,734. That technique involves a rather complex series of steps based on aqueous, ambient temperature leaching, and involves precipitating the arsenic in the form of an insoluble ferric arsenic compound. The other metals are separated in previous or successive process steps.

OBJECTS AND SUMMARY OF THE INVENTION

It is an object of this invention to provide an effective yet simple technique to recover the indium and lead values of lead-processing dusts that contain indium and may also contain copper, arsenic, or other metals.

It is another object of this invention to provide a technique which recovers a high percentage of the indium and lead present in the dust.

It is a further object to provide a technique that concentrates the indium into a small amount of solids from which a majority of the original lead, copper, and arsenic have been removed.

It is a more specific object to develop technologies for the treatment of low-grade, lead-containing, indium feed-stocks, such as flue dusts and residues, for which conventional recovery methods are uneconomical because of low concentrations of indium in the presence of a significant amount of lead in the feedstock.

In accordance with an aspect of the invention, a majority of the lead is separated from the indium prior to indium recovery. To accomplish this the dust or feedstock is mixed into a stirred bath of sodium-doped lead bullion at temperatures from 600° C. to 900° C., preferably about 700° C. Appropriate fluxes, such as soda ash, are added with the feedstock to the bullion. Reaction of the sodium and dusts produces a liquid dross or slag which can be removed from the bullion. The indium reports to the dross and a majority of the lead initially present in the feed-stock is reduced and reports to the bullion. The separated dross is water leached to remove any sodium compounds present in the dross. The indium compounds are insoluble in an alkaline environment. The residue or filter cake contains any indium present in the initial dross. The resultant filter cake contains a relatively high concentration of indium, and can be processed for the recovery of indium using conventional methods.

Any arsenic in the dross is leached out and reports to the filtrate, where it too can be processed for recovery by conventional methods.

Preferably, the sodium contained in the molten lead bath is present in an amount of up to 30% by weight of the dust added to the bath. The leaching can be accomplished, for example, by adding water to dross, for example, in an amount of about five parts water by weight to one part dross.

The above and many other objects, features, and advantages of this invention will be more fully appreciated from the ensuing description of a preferred embodiment of this invention, which should be read in conjunction with the accompanying Drawing.

DETAILED DESCRIPTION OF THE PREFERRED EMBODIMENT

Figure 1:
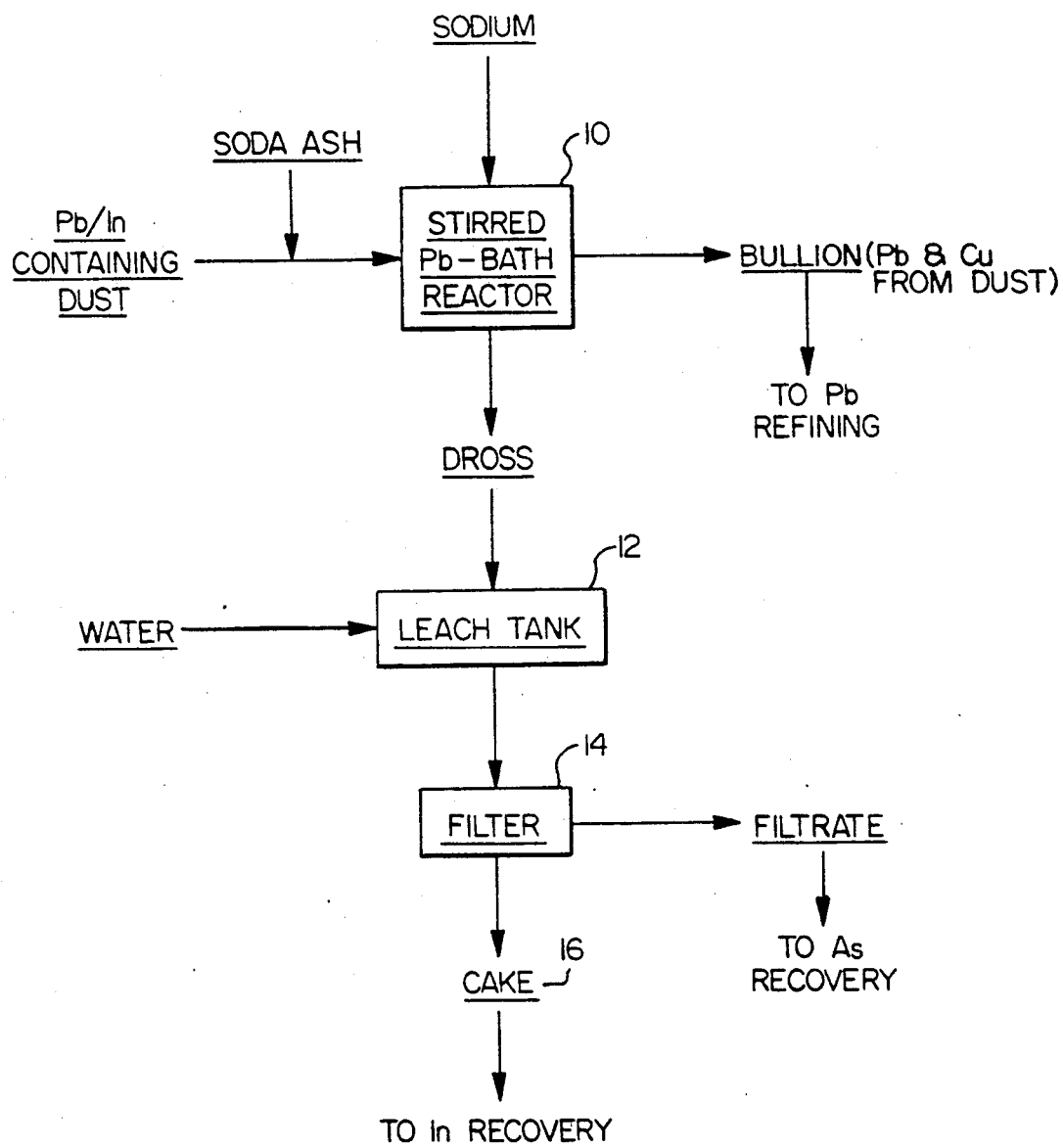
FIG. 1 is a flow chart explaining the principles of this invention.

With reference to the Drawing, and initially to FIG. 1, the process of this invention is applicable to by-products of smelting operations, i.e., to residues or dusts from zinc, copper, and lead ore refining operations. In actual tests, dusts that were generated by a lead smelter operation (referred to below as "Kellogg Dusts") and a copper/zinc smelting operation (referred to as the "Cottrell Dusts"), and water-leached copper smelting operation dust (Cottrell Residue") were processed, all yielding a beneficiated product from which indium can be economically extracted.

In this process, a quantity of lead bullion (e.g., in this example 125 to 135 pounds, the amount depending on the scale of the recovery operation) is melted in a reactor 10, and is heated to a temperature in the range of about 650° to 900° C. Sodium metal is gradually added to the molten lead. The molten metal in the reactor is stirred to dissolve the sodium in the lead.

Dusts that contain lead and indium, i.e., Kellogg Dusts, Cottrell Dusts, or Cottrell Residue, are added to the surface of the bath. Soda ash in an amount of about 15-35 weight percent is blended with the feedstock dusts prior to adding them to the sodium-doped lead bath. This produces a liquid dross which is easier to handle than a solid dross. For the bath here described, a typical charge was about five pounds of dusts. Then a rotary stirrer is actuated to stir the bath and contact the dusts with the sodium dissolved in the lead bath. The bullion and dross phases were continuously mixed for about ten minutes after feedstock addition. Then the bath was permitted to equilibrate for a sufficient time, e.g. one hour. After the reaction the dross was ladled off and cast into molds and allowed to cool. The lead bath was cooled down to 400° C., and then was ladled into ingot molds for further lead refining.

The dusts used as feedstocks were initially analyzed and found to have compositions as indicated in Table 1

TABLE 1

| FEEDSTOCK | COTTRELL DUST | COTTRELL RESIDUE | KELLOGG DUST |
|---|---|---|---|
| $In_2O_3$ | 0.300% | 0.590% | 0.230% |
| $PbSO_4$ | 6.32% | 19.65% | 28.34% |
| $PbO$ | 0.23% | 4.31% | 9.76% |
| $Cu_2O$ | 7.70% | 11.28% | 0.08% |
| $CuSO_4$ | 14.37% | 0.00% | 0.00% |
| $ZnO$ | 7.73% | 10.08% | 8.38% |
| $ZnSO_4$ | 25.00% | 0.00% | 0.00% |
| $As_2O_3$ | 12.07% | 7.65% | 10.47% |
| $Ag_2O$ | 0.020% | 0.075% | 0.010% |
| $Na_2O$ | 18.66% | 20.62% | 28.57% |
| OTHER | 7.60% | 25.75% | 14.18% |
| TOTAL | 100.00% | 100.00% | 100.00% |

The dusts contain large proportions of lead with lesser proportions of zinc and copper, which are present as oxides or sulfates. Arsenic is present in significant quantities, as are indium and silver. Other metallic elements are present in lesser quantities, and their presence can be largely disregarded.

In the reactor, the sodium reacts with the lead, silver, and copper salts, and a majority of the lead, silver, and copper report to the bullion. A majority of the indium, zinc, and arsenic report to the dross.

The cast dross is crushed and pulverized, and remaining bullion particles are removed from it. Then the dross powder is transferred to a leach tank 12. Water is added, and the sodium salts are removed from the dross by water leaching. The leachate is passed through a filter 14, and the filtrate is reserved. The residual dross is held as a filter cake 16 and is subjected to a series of rinses with distilled water. The rinse is reserved with the filtrate.

Indium recovery to the filter cake 16 is typically about 90 to 95%, while lead retention in the filter cake is typically only 5 to 15%. The concentration of indium in the filter cake 16 is generally twice that in the original feedstock, while the ratio of lead to indium drops by a factor of about six. Recovery of other elements to the filter cake is typically as follows:

| zinc | 95 to 100% |
|---|---|
| copper | 20 to 35% |
| arsenic | 0.3 to 5% |

The majority of the copper reports to the bullion, while the majority of the arsenic reports to the filtrate.

Sodium consumption is typically between 0.1 and 0.2 pounds of sodium per pound of feedstock, but is dependent on the chemical composition of the feedstock.

As seen in Table 1, the indium, arsenic, and silver are present as their oxides while the lead, zinc, and copper can be present as both the oxide and the sulfate. One difference between the three materials is that Cottrell Dust contains the sulfates of copper and zinc while both Kellogg Dusts and Cottrell Residue do not. The zinc and copper sulfates are absent from Cottrell Residue because of a preliminary low-acid leach on Cottrell Dust. Another dissimilarity is that the indium concentration in the Cottrell Residue is roughly two to three times that of Cottrell Dusts and Kellogg Dusts.

The major constituents illustrate the origin of the three materials. For both Cottrell Dusts and Cottrell Residues, one of the principal components is copper, reflecting that these are by-products of a copper operation. Kellogg Dusts, on the other hand, contains a large amount of lead, revealing that the dust originates in a lead process.

The three materials contain more compounds than those listed in Table 1; however, the compounds listed include the principal components and those components important to commercial success, such as silver. Any other species were present in small amounts and could be ignored.

The reactor chemistry consists of a series of reactions that partition the various components between the bullion and dross phases. The components reporting to the dross are compounds i.e., salts or oxides. The components reporting to the bullion are dissolved metallic elements.

Figure 2:
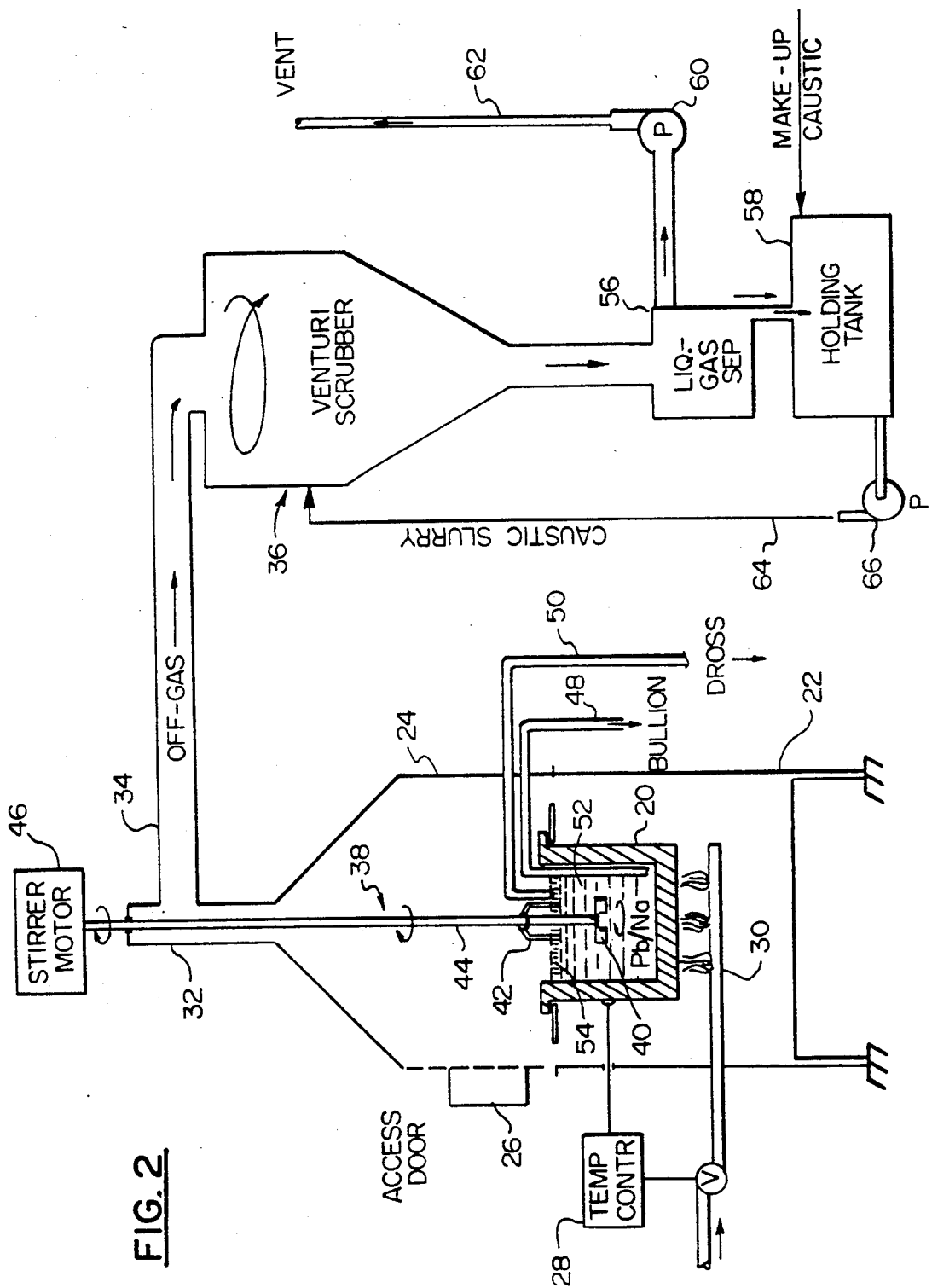
FIG. 2 is a schematic elevation of the stirred lead bath reactor in which the process of this invention can be practiced.

The stirred-lead reactor apparatus employed can be arranged as shown in FIG. 2. As illustrated schematically, a cast-iron kettle 20 is employed to contain the sodium-doped lead bath. The cast iron kettle 20 is contained within a hooded gas-fired furnace 22 with a conical hood 24 to isolate the reactor environment from the workplace environment. One or more access doors 26 are incorporated into the hood 24 for the addition and removal of material. The furnace 22 has a thermal control 28 that controls the flow of gas to a gas jet burner 30. This furnace can be accurately controlled within a temperature range of 25° C. to 800° C. The off-gas from the furnace 22 contains solid particulates, volatile species, makeup air, and natural gas combustion products. A tee section of flue pipe 32 is mounted at the top of the hood assembly to allow passage of off-gases through an exhaust pipe 34 to a venturi scrubber 36. The tee section 32 also provides access to the reactor kettle for a stirrer assembly 38.

The stirrer assembly includes a stainless-steel stirrer impeller 40 and a cast iron surface agitator 42, both of which are mounted on a stainless-steel shaft 44 that extends up through the tee section 32. A three-quarter-horsepower motor 46 coupled to a gear reducer (not shown) drives the shaft which here is suspended into the kettle.

Pick-up tubes 48 and 50 for the bullion and dross can be inserted into the bullion phase 52 and the liquid dross phase 54, respectively, to draw these off after a reaction.

The venturi scrubber 36 has its lower, discharge end coupled to a gas/liquid separator 56 that drains into a scrubber solution holding tank 58. An exhaust-gas side of the separator 56 is connected to a vacuum pump 60 that exhausts through an exhaust vent 62. The vacuum pump 60 is sized so that make-up air is drawn through the stirrer end of the tee section 32. The flow of make-up air through the tee section 32 ensures isolation of the reactor environment from the workplace. Any volatile species and particulates are removed by a stream of caustic solution that is pumped from the tank 58 through a supply pipe 64 and injected into the scrubber 36. The caustic solution returns to the holding tank 58 and is cycled back to the venturi scrubber by action of a slurry pump 66.

To operate, the kettle 20 is loaded with substantially pure lead (99.99%), with a typical charge being about 135 pounds. Then, the lead bath is heated to the desired temperature (e.g., 650° C.). The stirrer assembly 38 is lowered into the kettle 20, and the motor 46 is actuated. To insert the sodium, the stirrer 38 is stopped and a clear shield is placed across the access door 26. A quantity, e.g. 0.25 pounds, of metallic sodium is grasped with a pair of tongs and is carried around the shield and through the access door over the kettle. The sodium is rapidly immersed into the lead bath. The sodium melts and dissolves rapidly, e.g. in about one second. Then stirring is resumed. This is repeated until sufficient sodium has been introduced into the bath.

After the sodium addition has been completed, the lead bath can be sampled and a sample slug cast.

At this time, a mixture of soda ash flux ($Na_2CO_3$) and feedstock (e.g. Cottrell Dust, Cottrell Residue, or Kellogg Dust) is placed on the top of the molten lead bath. A typical charge weight is five pounds. Then the stirrer is actuated to mix the feedstock into the bath. This can take from ten minutes to an hour. Thereafter the dross and bullion phases are permitted to equilibrate for a predetermined time, e.g., one hour. After the reaction time has elapsed, the dross is ladled off, cast into molds, and permitted to cool.

At this point, another charge of sodium can be added to the lead bath, and another charge of feedstock can be added and the process repeated for the desired number of cycles.

The lead in the kettle is cooled down to about 400° C., and then is ladled out into ingot molds. When the reactor is cooled sufficiently, any dross can be scraped from the sides of the kettle and from the stirring assembly.

The dross is then pulverized and subjected to a water leaching, as described previously.

As an example, the process results for six runs, i.e. runs A, B, C, D, E, and F, were carried out under the following respective conditions:

| | Run A | Run B | Run C |
|---|---|---|---|
| Feedstock | Cottrell Residue | Cottrell Residue | Cottrell Residue |
| Bath Temp | 675° C. | 790° C. | 790° C. |
| Flux | 15% $Na_2CO_3$ | 15% $Na_2CO_3$ | 35% $Na_2CO_3$ 2 cycles 70% $Na_2CO_3$ 2 cycles |

| Dross | Molten Layer | Molten Layer | Molten Layer |
|---|---|---|---|
| | Run D | Run E | Run F |
| Feedstock | Kellogg Dust | Kellogg Dust | Kellogg Dust |
| Bath Temp | 600° C. | 690° C. | 790° C. |
| Flux | None | 15% $Na_2CO_3$ | 15% $Na_2CO_3$ |
| Dross | Pasty Layer | Molten Layer | Molten Layer |

Run A

Run A involved 15.77 pounds of Cottrell Residue treated in three successive cycles in the lead-sodium bath, each cycle involving about five pounds of dust. Samples of dross and bullion were taken in each cycle. A summary of the process results are as given in the following Tables 2 and 3. In table 2 the portions are given as a percent by weight except, where indicated, as parts per million by weight. The normalized distribution of the constituents of the dust is given in Table 3. It is clear that the vast majority of the indium reports to the dross while most of the lead and copper report to the bullion. Upon leaching of the dross, the majority of the indium (over 90%) reports to the filter cake.

TABLE 2

| | | | Run A | | | | | | |
|---|---|---|---|---|---|---|---|---|---|
| Phase | Weight (lbs.) | % Pb/% In | % In | % Pb | % Na | % Cu | % Zn | % As | % S |
| As-received Dust | 15.77 | 40.635 | 0.63 | 25.6 | 0.01 | 12.9 | 11.4 | 7.3 | 3.96 |
| Drosses (Blended) | 22.47 | 8.1824 | 0.423 | 3.46 | 35.34 | 1.73 | 7.98 | 5.21 | 3.39 |
| Filter Cake (Blended) | 5.95 | 5.3813 | 1.719 | 9.25 | 4.32 | 7.17 | 13.79 | 1.08 | |
| | | | (ppm) | | (ppm) | (ppm) | (ppm) | (ppm) | |
| Bullion | 137.69 | NA | 3 | 99.17 | 8200 | 7900 | 27 | 2100 | |
| Filtrate (Blended) | 128.87 | NA | 2.90 | 0.031 | 62633 | 1.13 | 2423 | 8706 | |

TABLE 3

| | Normalized Distribution - Run A | | | | | | |
|---|---|---|---|---|---|---|---|
| Phase | Weight (lbs.) | % In | % Pb | % Na | % Cu | % Zn | % As |
| As-received Dust | 100 | 100 | 100 | — | 100 | 100 | 100 |
| Drosses (Blended) | 142.53 | 95.59 | 19.25 | — | 19.11 | 99.79 | 101.64 |
| Bullion | — | 0.42 | — | — | 53.49 | 0.21 | 25.12 |
| Reactor Product Total | — | 96.01 | — | — | 72.60 | 99.99 | 126.76 |
| Filter Cake (Blended) | 37.77 | 103.03 | 13.64 | — | 20.98 | 45.70 | 5.58 |
| Filtrate (Blended) | — | 0.38 | 0.00 | — | 0.01 | 17.37 | 97.48 |
| Process Product Total | — | 103.82 | — | — | 74.48 | 63.29 | 128.19 |

Run B

This run similarly involved 15.89 pounds of Cottrell Residue, treated in three successive cycles. Here the bath temperature was somewhat higher than in run A(790° C.) The results are indicated in the following Tables 4 and 5:

TABLE 4

| | | | Run B | | | | | | |
|---|---|---|---|---|---|---|---|---|---|
| Phase | Weight (lbs.) | % Pb/% In | % In | % Pb | % Na | % Cu | % Zn | % As | % S |
| As-received Dust | 15.89 | 40.635 | 0.63 | 25.6 | 0.01 | 12.9 | 11.4 | 7.3 | 3.96 |
| Drosses (Blended) | 24.02 | 10.703 | 0.410 | 4.39 | 36.23 | 1.55 | 7.15 | 4.72 | 2.96 |

TABLE 4-continued

| | | | Run B | | | | | | |
|---|---|---|---|---|---|---|---|---|---|
| Phase | Weight (lbs.) | % Pb/% In | % In | % Pb | % Na | % Cu | % Zn | % As | % S |
| Filter Cake (Blended) | 6.17 | 12.346 | 1.147 | 14.16 | 1.69 (ppm) | 4.40 (ppm) | 9.47 (ppm) | 0.13 (ppm) | |
| Bullion | 138.81 | NA | 5 | 99.408 | 8200 | 11200 | 41 | 220 | |
| Filtrate (Blended) | 137.95 | NA | 1.61 | 0.039 | 90921 | 40.03 | 3417 | 7701 | |

TABLE 5

| | Normalized Distribution - Run B | | | | | | |
|---|---|---|---|---|---|---|---|
| Phase | Weight (lbs.) | % In | % Pb | % Na | % Cu | % Zn | % As |
| As-received Dust | 100 | 100 | 100 | — | 100 | 100 | 100 |
| Drosses (Blended) | 151.16 | 98.42 | 25.92 | — | 18.19 | 94.82 | 97.64 |
| Bullion | — | 0.69 | — | — | 75.84 | 0.31 | 2.63 |
| Reactor Product Total | — | 99.114 | — | — | 94.03 | 95.13 | 100.27 |
| Filter Cake (Blended) | 38.80 | 70.63 | 21.46 | — | 13.23 | 32.25 | 0.70 |
| Filtrate (Blended) | — | 0.22 | 0.00 | — | 0.27 | 26.02 | 91.59 |
| Process Product Total | — | 71.54 | — | — | 89.34 | 58.58 | 94.93 |

Run C

Run C involved treatment of 19.81 pounds of Cottrell Residue, in four successive cycles using batches of dust of about five pounds each. For the first two cycles, soda ash in the amount of 35% of total mix was blended with the dust. For the second two cycles the soda ash content was increased to 70% of the total. The lead bath temperature was held at 790° C. The results of the process are as shown in Table 6 and 7.

TABLE 6

| | | | Run C | | | | | | |
|---|---|---|---|---|---|---|---|---|---|
| Phase | Weight (lbs.) | % Pb/% In | % In | % Pb | % Na | % Cu | % Zn | % As | % Ag |
| As-received Dust | 19.81 | 40.635 | 0.630 | 25.60 | 0.01 | 12.90 | 11.40 | 7.30 | 0.0909 |
| Drosses (Blended) | 29.45 | 13.611 | 0.318 | 4.33 | 34.94 | 2.65 | 6.80 | 4.73 | 0.0074 |
| Filter Cake (Blended) | 6.12 | 12.544 | 2.12 | 26.65 | 1.20 (ppm) | 31.78 (ppm) | 18.12 (ppm) | 0.51 (ppm) | 0.0597 (ppm) |
| Bullion | 127.70 | NA | 15 | 98.50 | 8200 | 11020 | 100 | 1500 | 100 |
| Filtrate (Blended) | 141.48 | NA | 2.40 | 0.33 | 73686 | 99.41 | 6000 | 9317.9 | 0.24 |

TABLE 7

| | Normalized Distribution - Run C | | | | | | | |
|---|---|---|---|---|---|---|---|---|
| Phase | Weight (lbs.) | % In | % Pb | % Na | % Cu | % Zn | % As | % Ag |
| As-received Dust | 100 | 100 | 100 | — | 100 | 100 | 100 | 100 |
| Drosses (Blended) | 148.66 | 75.05 | 25.14 | — | 30.52 | 88.68 | 96.28 | 12.14 |
| Bullion | — | 1.53 | — | — | 55.07 | 0.57 | 13.25 | 70.91 |
| Reactor Product Total | — | 75.585 | — | — | 85.582 | 89.248 | 109.53 | 83.052 |
| Filter Cake (Blended) | 30.91 | 104.25 | 32.18 | — | 76.15 | 49.12 | 2.17 | 20.29 |
| Filtrate (Blended) | — | 0.27 | 9.31 | — | 0.55 | 37.59 | 91.16 | 0.19 |
| Process Product Total | — | 106.05 | — | — | 131.76 | 87.28 | 106.57 | 91.39 |

Run D

In run D, there were three cycles of treatment of Kellogg Dust, done without flux, at a lead bath temperature of 600° C. In this case the dross appeared as a pasty layer, rather than as a molten layer. The percent of indium that ultimately reported to the filter cake amounted to only 36.43%, as shown in Table 9, although the ratio by weight-percent of lead to indium was significantly reduced (i.e. three-fold) as shown in Table 8.

TABLE 8

| | | | Run D | | | | | | |
|---|---|---|---|---|---|---|---|---|---|
| Phase | Weight (lbs.) | % Pb/% In | % In | % Pb | % Na | % Cu | % Zn | % As | % S |
| As-received Dust | 16.53 | 132.67 | 0.3 | 39.8 | 0.45 | 0.1 | 9.42 | 11.1 | 4.19 |
| Drosses (Blended) | 14.21 | 42.09 | 0.230 | 9.70 | 31.33 | 0.42 | 7.51 | 7.41 | 2.97 |
| Filter Cake (Blended) | 3.91 | 46.482 | 0.462 | 21.48 | 3.39 (ppm) | 0.54 (ppm) | 13.71 (ppm) | 0.25 (ppm) | |
| Bullion | 140.41 | NA | 1 | 98.168 | 8200 | 428 | 5 | 910 | |
| Filtrate (Blended) | 81.35 | NA | 0.21 | 0.005 | 59823 | 4.87 | 1104 | 12906 | |

TABLE 9

| | Normalized Distribution - Run D | | | | | | |
|---|---|---|---|---|---|---|---|
| Phase | Weight (lbs.) | % In | % Pb | % Na | % Cu | % Zn | % As |
| As-received | | 100 | 100 | 100 | — | 100 | 100 | 100 |

TABLE 9-continued

| | Normalized Distribution - Run D | | | | | | |
|---|---|---|---|---|---|---|---|
| Phase | Weight (lbs.) | % In | % Pb | % Na | % Cu | % Zn | % As |
| Dust | | | | | | | |
| Drosses (Blended) | 85.96 | 66.02 | 20.94 | — | 357.1 | 68.55 | 57.39 |
| Bullion | — | 0.28 | — | — | 363.6 | 0.05 | 6.96 |
| Reactor Product Total | — | 66.30 | — | — | 720.7 | 68.59 | 64.35 |
| Filter Cake (Blended) | 23.65 | 36.43 | 12.76 | — | 127.8 | 34.41 | 0.53 |
| Filtrate (Blended) | — | 0.04 | 0.00 | — | 2.4 | 5.77 | 57.22 |
| Process Product Total | — | 36.74 | — | — | 493.8 | 40.23 | 64.71 |

Run E

Run E involved three process cycles of a total of 13.21 pounds of Kellogg Dust, at a bath temperature of 690° C. Soda ash flux was blended into the feedstock at 15% of the total by weight. The dross appeared as a liquid, and improved benefaction of indium resulted, as compared with Run D. The results of this run are shown in Tables 10 and 11.

TABLE 10

| | Run E | | | | | | | | |
|---|---|---|---|---|---|---|---|---|---|
| Phase | Weight (lbs.) | % Pb/% In | % In | % Pb | % Na | % Cu | % Zn | % As | % S |
| As-received Dust | 13.21 | 132.87 | 0.3 | 39.8 | 0.45 | 0.1 | 9.42 | 11.1 | 4.19 |
| Drosses (Blended) | 13.74 | 7.0244 | 0.265 | 1.86 | 33.12 | 0.04 | 7.74 | 8.41 | 2.73 |
| Filter Cake (Blended) | 3.77 | 8.3746 | 0.771 | 6.46 | 5.14 | 0.12 | 25.37 | 0.13 | |
| | | | (ppm) | | (ppm) | (ppm) | (ppm) | (ppm) | |
| Bullion | 131.82 | NA | 25 | 97.598 | 8200 | 292 | 89 | 1300 | |
| Filtrate (Blended) | 78.67 | NA | 0.23 | 0.001 | 60932 | 0.61 | 458 | 16512 | |

TABLE 11

| | Normalized Distribution - Run E | | | | | | |
|---|---|---|---|---|---|---|---|
| Phase | Weight (lbs.) | % In | % Pb | % Na | % Cu | % Zn | % As |
| As-received Dust | 100 | 100 | 100 | — | 100 | 100 | 100 |
| Drosses (Blended) | 104.02 | 91.75 | 4.86 | — | 37.45 | 85.50 | 78.78 |
| Bullion | — | 8.32 | — | — | 291.41 | 0.94 | 11.69 |
| Reactor Product Total | — | 100.06 | — | — | 328.86 | 86.446 | 90.464 |
| Filter Cake (Blended) | 28.52 | 73.30 | 4.63 | — | 34.23 | 76.83 | 0.33 |
| Filtrate (Blended) | — | 0.05 | 0.00 | — | 0.37 | 2.90 | 88.60 |
| Process Product Total | — | 81.66 | — | — | 326.01 | 80.67 | 100.62 |

TABLE 11-continued

| | Normalized Distribution - Run E | | | | | | |
|---|---|---|---|---|---|---|---|
| Phase | Weight (lbs.) | % In | % Pb | % Na | % Cu | % Zn | % As |
| Total | | | | | | | |

Run F

Run F involved three cycles of process of 15.54 pounds of Kellogg Dust, blended with soda ash at 15% by weight, and with the bath temperature at 790° C. The results are as indicated in Tables 12 and 13. Here a somewhat smaller percentage of the indium reported to the filter cake than in Run E, while a higher percentage of the lead and copper reported to the dross and remained in the filter cake. While a majority of the arsenic reported to the filtrate in Run F, the increase in arsenic in filter cake from Run E to Run F appears to be about five-fold. The bath temperature was the only parameter that significantly changed from Run E to Run F.

TABLE 12

| | Run F | | | | | | | | |
|---|---|---|---|---|---|---|---|---|---|
| Phase | Weight (lbs.) | % Pb/% In | % In | % Pb | % Na | % Cu | % Zn | % As | % S |
| As-received Dust | 15.54 | 132.67 | 0.3 | 39.8 | 0.45 | 0.1 | 9.42 | 11.1 | 4.19 |
| Drosses (Blended) | 16.46 | 10.551 | 0.207 | 2.18 | 36.21 | 0.03 | 6.34 | 7.12 | 2.42 |
| Filter Cake (Blended) | 4.54 | 13.7 | 0.618 | 8.46 | 6.09 | 0.05 | 13.33 | 0.60 | |
| | | | (ppm) | | (ppm) | (ppm) | (ppm) | (ppm) | |
| Bullion | 136.88 | NA | 10 | 99.669 | 8200 | 256 | 75 | 560 | |
| Filtrate (Blended) | 94.22 | NA | 0.18 | 0.001 | 62006 | 0.15 | 1314 | 9489 | |

TABLE 13

| | Normalized Distribution - Run F | | | | | | |
|---|---|---|---|---|---|---|---|
| Phase | Weight (lbs.) | % In | % Pb | % Na | % Cu | % Zn | % As |
| As-received Dust | 100 | 100 | 100 | — | 100 | 100 | 100 |
| Drosses (Blended) | 105.93 | 73.08 | 5.81 | — | 28.32 | 71.29 | 67.98 |
| Bullion | — | 2.94 | — | — | 225.50 | 0.70 | 4.44 |
| Reactor Product Total | — | 76.019 | — | — | 253.82 | 71.987 | 72.421 |
| Filter Cake (Blended) | 29.24 | 60.20 | 6.22 | — | 13.40 | 41.37 | 1.57 |
| Filtrate (Blended) | — | 0.04 | 0.00 | — | 0.09 | 8.46 | 51.83 |
| Process Product Total | — | 63.17 | — | — | 239.00 | 50.53 | 57.85 |

Although the Kellogg Dust and Cottrell Residue feedstocks do respond somewhat differently to treatment, there is a uniformity in that in each case a majority of the indium reports to the filter cake, a majority of the lead reports to the bullion, and a majority of the arsenic reports to the filtrate.

The importance of soda ash is seen by comparing the results of runs D, E, and F. The amount of metallic sodium consumed per pound of feedstock dust decreases in relation to the amount of soda ash present in the initial charge. The amount of soda ash present and the doped-lead bath temperature can each be adjusted to achieve optimal results for any given indium-containing dust.

Of course, the treatment process is not limited to the specific dusts disclosed hereabove, which serve only as examples. This process can be used with any refining process residue which contains indium, lead and/or arsenic to facilitate their recovery.

While the invention has been described in detail with reference to certain preferred embodiments, it should be understood that the invention is not limited to those precise embodiments. Rather, many modifications and variations would present themselves to those skilled in the art without departing from the scope and spirit of this invention, as defined in the appended claims.

What is claimed is:

1. A process of treating indium-containing and lead-containing dusts to recover the indium and lead values thereof and to separate the indium from a majority of any lead, silver, copper, or arsenic that may be present in the dust, comprising:
   a. preparing a stirred bath of molten lead and dissolved molten sodium;
   b. adding the dust to the bath, wherein the dust reacts with the sodium to produce a dross phase which separates from a bullion phase, where a majority of the lead, silver, and copper contained in the dust report to the bullion phase and a majority of the indium and arsenic report to the dross phase;
   c. transferring the dross phase to a water leaching stage;
   d. leaching the dross phase to produce an aqueous leachate;
   e. filtering the leachate to produce a solid filter cake and a liquid filtrate, wherein a majority of the indium reports to the filter cake and a majority of the arsenic reports to the filtrate; and
   f. processing said filter cake to recover its indium value.

2. The process of claim 1, wherein preparing the stirred bath includes adding a suitable quantity of soda ash to the molten lead and molten sodium so that said dross is produced as a liquid dross.

3. The process of claim 1, wherein said sodium metal is added in an amount of up to about 20 percent by weight of the dust added to the bath.

4. The process of claim 1, wherein said leaching includes adding water to dross in an amount of about five parts water by weight to one part dross.

5. The process of claim 1, wherein said bath is maintained at a temperature in the range 600° C.–800° C.

6. The process of claim 5, wherein said temperature is substantially 700° C.

7. A process of treating metal processing dusts that contain lead and in which arsenic may be present to separate a majority of the arsenic from the lead, comprising:
   a. preparing a stirred bath of molten lead and molten sodium;
   b. adding the dust to the bath, wherein the dust reacts with the sodium to produce a dross phase which separates from a bullion phase,, where a majority of the lead contained in the dusts reports to the bullion phase, and a majority of the arsenic reports to the dross phase;
   c. removing the dross phase from the bullion phase.

8. The process of claim 7 wherein said dross phase is further subjected to a water leaching process and the process further comprises
leaching the dross phase to produce an aqueous leachate; filtering the leachate to produce a solid filter cake and a liquid filtrate, wherein a majority of the arsenic reports to the filtrate.

9. The process of claim 7 wherein said sodium metal is added in an amount of up to about 20 percent by weight of the dust added to the bath.

10. The process of claim 7 wherein said bath is maintained at a temperature in the range of 600° C. to 800° C.

* * * * *

UNITED STATES PATENT AND TRADEMARK OFFICE
CERTIFICATE OF CORRECTION

PATENT NO. : 5,108,497
DATED : April 28, 1992
INVENTOR(S) : NICHOLAS B. GOMEZ et al.

It is certified that error appears in the above—identified patent and that said Letters Patent is hereby corrected as shown below:

Col. 12, line 23, after "and" insert --dissolved--.

Signed and Sealed this

Sixth Day of July, 1993

Attest:

MICHAEL K. KIRK

Attesting Officer     Acting Commissioner of Patents and Trademarks